United States Patent
Brenneis et al.

(10) Patent No.: US 9,676,989 B2
(45) Date of Patent: *Jun. 13, 2017

(54) SEALANT COMPOSITIONS COMPRISING CEMENT KILN DUST AND TIRE-RUBBER PARTICLES AND METHOD OF USE

(75) Inventors: D. Chad Brenneis, Marlow, OK (US); Craig W. Roddy, Duncan, OK (US); Rickey L. Morgan, Duncan, OK (US); Ronnie G. Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 703 days.

This patent is subject to a terminal disclaimer.

(21) Appl. No.: 13/605,875

(22) Filed: Sep. 6, 2012

(65) Prior Publication Data

US 2012/0325476 A1   Dec. 27, 2012

Related U.S. Application Data

(60) Continuation-in-part of application No. 12/821,412, filed on Jun. 23, 2010, now Pat. No. 8,307,899, which is a continuation-in-part of application No. 12/606,381, filed on Oct. 27, 2009, now Pat. No. 7,743,828, which is a continuation-in-part of application No. 12/420,630, filed on Apr. 8, 2009, now Pat. No. 7,631,692, which is a continuation-in-part of application No. 12/349,676, filed on Jan. 7, 2009, now Pat. No. 7,674,332, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
| | |
|---|---|
| *E21B 33/13* | (2006.01) |
| *C09K 8/42* | (2006.01) |
| *C04B 28/02* | (2006.01) |
| *C09K 8/467* | (2006.01) |
| *C09K 8/473* | (2006.01) |
| *C04B 26/02* | (2006.01) |
| *C09K 8/44* | (2006.01) |
| *C04B 111/10* | (2006.01) |

(52) U.S. Cl.
CPC .............. *C09K 8/426* (2013.01); *C04B 26/02* (2013.01); *C04B 28/021* (2013.01); *C09K 8/44* (2013.01); *C09K 8/467* (2013.01); *C09K 8/473* (2013.01); *C04B 2111/1037* (2013.01); *Y02W 30/92* (2015.05); *Y02W 30/94* (2015.05); *Y02W 30/95* (2015.05); *Y02W 30/96* (2015.05)

(58) Field of Classification Search
None
See application file for complete search history.

(56) References Cited

U.S. PATENT DOCUMENTS

| | | |
|---|---|---|
| 1,931,921 A | 10/1933 | Breerwood |
| 2,021,956 A | 11/1935 | Gladney et al. |
| 2,045,899 A | 6/1936 | Davis |
| 2,094,316 A | 9/1937 | Cross et al. |
| 2,133,622 A | 10/1938 | Larmour et al. |
| 2,144,254 A | 1/1939 | Breerwood |
| 2,193,775 A | 3/1940 | Stratford |
| 2,193,807 A | 3/1940 | Dieterich |
| 2,214,715 A | 9/1940 | Breerwood |
| 2,329,940 A | 9/1943 | Ponzer |
| 2,592,468 A | 4/1952 | Rex et al. |
| 2,772,739 A | 12/1956 | Arie |
| 2,805,719 A | 9/1957 | Anderson |
| 2,842,205 A | 7/1958 | Allen et al. |
| 2,844,361 A | 7/1958 | Dilcher et al. |
| 2,848,051 A | 8/1958 | Willaims |
| 2,871,133 A | 1/1959 | Palonen et al. |
| 2,880,096 A | 3/1959 | Hurley |
| 2,945,769 A | 7/1960 | Gama et al. |
| 3,024,125 A | 3/1962 | Lee |
| 3,066,031 A | 11/1962 | Schifferle |
| 3,168,139 A | 2/1965 | Kennedy et al. |
| 3,320,077 A | 5/1967 | Prior |
| 3,411,580 A | 11/1968 | Roberts et al. |
| 3,421,703 A | 1/1969 | Galer |
| 3,454,095 A | 7/1969 | Messenger et al. |
| 3,467,193 A | 9/1969 | Messenger |
| 3,473,939 A | 10/1969 | Mayberry et al. |
| 3,499,491 A | 3/1970 | Wyant et al. |
| 3,557,876 A | 1/1971 | Tragesser |

(Continued)

FOREIGN PATENT DOCUMENTS

| | | |
|---|---|---|
| CA | 2064682 | 4/1992 |
| CA | 2336077 | 1/2000 |

(Continued)

OTHER PUBLICATIONS

USPTO Notice of Allowance for U.S. Appl. No. 13/662,111 dated Oct. 21, 2013.
USPTO Final Office Action for U.S. Appl. No. 13/620,013 dated Oct. 2, 2013.
USPTO Final Office Action for U.S. Appl. No. 13/851,925 dated Sep. 20, 2013.
USPTO Office Action for U.S. Appl. No. 13/180,238 dated Sep. 25, 2013.
USPTO Final Office Action for U.S. Appl. No. 13/767,710 dated Sep. 20, 2013.
USPTO Office Action for U.S. Appl. No. 13/477,777 dated Sep. 20, 2013.

(Continued)

*Primary Examiner* — Angela M DiTrani
(74) *Attorney, Agent, or Firm* — Craig W. Roddy; Tumey L.L.P.

(57) ABSTRACT

Methods and compositions are provided that relate to sealant compositions comprising cement kiln dust, tire-rubber particles, and water. An embodiment discloses a method comprising: providing a sealant composition comprising cement kiln dust, tire-rubber particles, and water; and allowing the sealant composition to set to form a hardened mass.

23 Claims, No Drawings

(56) References Cited

U.S. PATENT DOCUMENTS

| | | |
|---|---|---|
| 3,574,113 A | 4/1971 | Shannon |
| 3,574,816 A | 4/1971 | Abbdellatif et al. |
| 3,628,973 A | 12/1971 | Greening et al. |
| 3,748,159 A | 7/1973 | George |
| 3,749,173 A | 7/1973 | Hill et al. |
| 3,863,718 A | 2/1975 | Bruist |
| 3,876,005 A | 4/1975 | Fincher et al. |
| 3,887,009 A | 6/1975 | Miller et al. |
| 3,887,385 A | 6/1975 | Quist et al. |
| 3,921,717 A | 11/1975 | Danjushevsky et al. |
| 3,959,007 A | 5/1976 | Pitt |
| 4,018,617 A | 4/1977 | Nicholson |
| 4,018,619 A | 4/1977 | Webster et al. |
| 4,031,184 A | 6/1977 | McCord |
| 4,036,301 A | 7/1977 | Powers et al. |
| 4,083,407 A | 4/1978 | Griffin et al. |
| 4,101,332 A | 7/1978 | Nicholson |
| 4,105,459 A | 8/1978 | Mehta |
| 4,141,843 A | 2/1979 | Watson |
| 4,176,720 A | 12/1979 | Wilson |
| 4,268,316 A | 5/1981 | Wills et al. |
| 4,274,881 A | 6/1981 | Langton |
| 4,304,300 A | 12/1981 | Watson |
| 4,333,764 A | 6/1982 | Richardson |
| 4,341,562 A | 7/1982 | Ahlbeck |
| RE31,190 E | 3/1983 | Detroit et al. |
| 4,400,474 A | 8/1983 | Copperthwaite et al. |
| 4,407,677 A | 10/1983 | Wills et al. |
| 4,423,781 A | 1/1984 | Thomas |
| 4,432,800 A | 2/1984 | Kneller et al. |
| 4,435,216 A | 3/1984 | Diehl et al. |
| 4,436,850 A | 3/1984 | Burdick et al. |
| 4,440,576 A | 4/1984 | Flannery et al. |
| 4,460,292 A | 7/1984 | Durham et al. |
| 4,462,835 A | 7/1984 | Car |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Kindt |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,098,612 A | 3/1992 | Rowsell |
| 5,113,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,183,506 A | 2/1993 | Zhang |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,290,355 A | 3/1994 | Jakel et al. |
| 5,295,543 A | 3/1994 | Terry et al. |
| 5,305,831 A | 4/1994 | Nahm |
| 5,314,022 A | 5/1994 | Cowan et al. |
| 5,316,083 A | 5/1994 | Nahm et al. |
| 5,327,968 A | 7/1994 | Onan et al. |
| 5,337,824 A | 8/1994 | Cowan |
| 5,339,902 A | 8/1994 | Harris |
| 5,346,548 A | 9/1994 | Mehta |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,421,409 A | 6/1995 | Mueller et al. |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,484,019 A | 1/1996 | Griffith |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,641,584 A | 6/1997 | Andersen et al. |
| 5,673,753 A | 10/1997 | Hale et al. |
| 5,681,384 A | 10/1997 | Liskowitz |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,873,413 A | 2/1999 | Chatterji |
| 5,874,387 A | 2/1999 | Carpenter et al. |
| 5,875,844 A | 3/1999 | Chatterji |
| 5,875,845 A | 3/1999 | Chatterji et al. |
| 5,875,846 A | 3/1999 | Chatterji |
| 5,897,699 A | 4/1999 | Chatterji et al. |
| 5,900,053 A | 5/1999 | Brothers et al. |
| 5,913,364 A | 6/1999 | Sweatman |
| 5,924,488 A * | 7/1999 | Nguyen ............... E21B 43/025 166/280.1 |
| 5,957,204 A | 9/1999 | Chatterji |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,196,316 B1 | 3/2001 | Bosma et al. |
| 6,220,354 B1 | 4/2001 | Chatterji et al. |
| 6,230,804 B1 | 5/2001 | Muller et al. |
| 6,244,343 B1 | 6/2001 | Brothers et al. |

(56) References Cited

U.S. PATENT DOCUMENTS

| | | |
|---|---|---|
| 6,245,142 B1 | 6/2001 | Reddy et al. |
| 6,258,757 B1 | 7/2001 | Sweatman et al. |
| 6,264,738 B1 | 7/2001 | Lorke et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer |
| 6,451,104 B2 | 9/2002 | Mehta |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,634 B1 | 1/2003 | Evans et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Crook et al. |
| 6,626,243 B1 | 9/2003 | Go Boncan |
| 6,641,658 B1 | 11/2003 | Dubey |
| 6,645,289 B2 | 11/2003 | Sobolev et al. |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 | 12/2003 | Chatterji et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 | 5/2004 | DiLullo et al. |
| 6,755,905 B2 | 6/2004 | Oates |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,869,474 B2 | 3/2005 | Perez-Pena |
| 6,869,475 B1 | 3/2005 | Krowl |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 | 4/2006 | Chatterji et al. |
| 7,048,053 B2 | 5/2006 | Santra et al. |
| 7,077,203 B1 | 7/2006 | Roddy et al. |
| 7,096,944 B2 | 8/2006 | Vargo et al. |
| 7,101,829 B2 | 9/2006 | Guichard |
| 7,174,962 B1 | 2/2007 | Roddy et al. |
| 7,182,137 B2 | 2/2007 | Fyten et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,285,164 B2 | 10/2007 | Luke et al. |
| 7,303,015 B2 | 12/2007 | Fyten |
| 7,325,611 B2 | 2/2008 | Santra et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,105 B2 | 3/2008 | Bingamon |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,445,669 B2 | 11/2008 | Roddy et al. |
| 7,478,675 B2 * | 1/2009 | Roddy et al. ............. 166/293 |
| 7,607,482 B2 | 10/2009 | Roddy et al. |
| 7,607,484 B2 | 10/2009 | Roddy et al. |
| 7,627,870 B1 | 12/2009 | Michaeli et al. |
| 7,631,692 B2 * | 12/2009 | Roddy et al. ............. 166/250.14 |
| 7,655,088 B2 | 2/2010 | Bethani |
| 7,674,332 B2 | 3/2010 | Roddy et al. |
| 7,741,841 B2 | 6/2010 | Edwards et al. |
| 7,743,828 B2 * | 6/2010 | Roddy et al. ............. 166/277 |
| 7,762,329 B1 | 7/2010 | Morgan |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,867,954 B2 | 1/2011 | Warrender et al. |
| 7,887,694 B2 | 2/2011 | Constantz et al. |
| 7,919,064 B2 | 4/2011 | Kawatra et al. |
| 7,922,809 B1 | 4/2011 | Constantz et al. |
| 7,927,419 B2 | 4/2011 | Roddy |
| 8,006,446 B2 | 8/2011 | Constantz et al. |
| 8,029,618 B2 | 10/2011 | Al-Shafei |
| 8,039,253 B2 | 10/2011 | Asou |
| 8,261,827 B2 | 9/2012 | Roddy |
| 8,276,666 B2 * | 10/2012 | Ravi et al. ............. 166/292 |
| 8,281,859 B2 | 10/2012 | Roddy |
| 8,297,357 B2 | 10/2012 | Brenneis |
| 8,307,899 B2 * | 11/2012 | Brenneis et al. ............. 166/293 |
| 8,318,642 B2 | 11/2012 | Roddy |
| 8,327,939 B2 | 12/2012 | Roddy |
| 8,333,240 B2 | 12/2012 | Roddy |
| 8,394,744 B2 | 3/2013 | Woytowich et al. |
| 8,399,387 B2 | 3/2013 | Roddy |
| 8,403,045 B2 | 3/2013 | Brenneis et al. |
| 8,434,553 B2 | 5/2013 | Brenneis et al. |
| 8,440,596 B2 | 5/2013 | Brenneis et al. |
| 8,486,868 B2 | 7/2013 | Brenneis et al. |
| 8,486,869 B2 | 7/2013 | Brenneis et al. |
| 8,522,873 B2 | 9/2013 | Benkely et al. |
| 8,544,543 B2 | 10/2013 | Chatterji et al. |
| 8,551,923 B1 | 10/2013 | Benkley et al. |
| 8,554,543 B2 | 10/2013 | Cherepanov et al. |
| 8,555,967 B2 | 10/2013 | Chatterji et al. |
| 2002/0033121 A1 | 3/2002 | Marko |
| 2002/0073897 A1 | 6/2002 | Trato |
| 2002/0117090 A1 | 8/2002 | Ku |
| 2002/0157575 A1 | 10/2002 | DiLullo et al. |
| 2003/0000423 A1 | 1/2003 | Vijn et al. |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0007360 A1 * | 1/2004 | Leroy-Delage et al. ...... 166/293 |
| 2004/0040474 A1 | 3/2004 | Perez-Pena et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |

(56) References Cited

U.S. PATENT DOCUMENTS

| | | |
|---|---|---|
| 2004/0163812 A1* | 8/2004 | Brothers .................. 166/293 |
| 2004/0168804 A1 | 9/2004 | Reddy et al. |
| 2004/0182577 A1 | 9/2004 | Chatterji et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061505 A1 | 3/2005 | Caveny et al. |
| 2005/0072599 A1 | 4/2005 | Luke et al. |
| 2005/0077045 A1 | 4/2005 | Chatterj et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2005/0205255 A1 | 9/2005 | Gagliano et al. |
| 2006/0025312 A1 | 2/2006 | Santra et al. |
| 2006/0054319 A1 | 3/2006 | Fyten |
| 2006/0065399 A1 | 3/2006 | Luke et al. |
| 2006/0081372 A1 | 4/2006 | Dealy et al. |
| 2006/0086499 A1 | 4/2006 | Badalamenti et al. |
| 2006/0166834 A1 | 7/2006 | Roddy |
| 2006/0175060 A1 | 8/2006 | Reddy |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0089643 A1 | 4/2007 | Roddy et al. |
| 2007/0102157 A1 | 5/2007 | Roddy et al. |
| 2007/0137528 A1 | 6/2007 | LeRoy-Delage et al. |
| 2007/0186820 A1 | 8/2007 | O'Hearn |
| 2007/0289744 A1 | 12/2007 | Bingamon et al. |
| 2008/0032901 A1* | 2/2008 | Hull et al. .................. 507/201 |
| 2008/0092780 A1 | 4/2008 | Bingamon et al. |
| 2008/0156491 A1 | 7/2008 | Roddy et al. |
| 2008/0229979 A1 | 9/2008 | Lewis |
| 2008/0236814 A1 | 10/2008 | Roddy |
| 2008/0300149 A1 | 12/2008 | Reddy et al. |
| 2009/0038801 A1* | 2/2009 | Ravi et al. .................. 166/293 |
| 2009/0044726 A1 | 2/2009 | Brouillette et al. |
| 2009/0105099 A1 | 4/2009 | Warrender et al. |
| 2009/0120640 A1 | 5/2009 | Kulakofsky |
| 2009/0120644 A1 | 5/2009 | Roddy et al. |
| 2009/0124522 A1 | 5/2009 | Roddy et al. |
| 2009/0145601 A1 | 6/2009 | Bailey |
| 2009/0200029 A1 | 8/2009 | Roddy et al. |
| 2009/0266543 A1 | 10/2009 | Reddy et al. |
| 2009/0312445 A1 | 12/2009 | Roddy et al. |
| 2009/0320720 A1 | 12/2009 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0044057 A1 | 2/2010 | Dealy et al. |
| 2010/0051266 A1 | 3/2010 | Roddy et al. |
| 2010/0051275 A1 | 3/2010 | Lewis et al. |
| 2010/0077922 A1 | 4/2010 | Constantz et al. |
| 2010/0081584 A1 | 4/2010 | Perez |
| 2010/0196104 A1 | 8/2010 | Constantz et al. |
| 2010/0212892 A1 | 8/2010 | Santra |
| 2010/0258035 A1 | 10/2010 | Constantz et al. |
| 2010/0258312 A1 | 10/2010 | Brenneis et al. |
| 2010/0273912 A1 | 10/2010 | Roddy et al. |
| 2010/0282466 A1 | 11/2010 | Brenneis et al. |
| 2010/0292365 A1 | 11/2010 | Roddy et al. |
| 2010/0294496 A1 | 11/2010 | Woytowich et al. |
| 2010/0313793 A1 | 12/2010 | Constantz et al. |
| 2011/0000400 A1 | 1/2011 | Roddy |
| 2011/0017452 A1 | 1/2011 | Benkley |
| 2011/0100626 A1 | 5/2011 | Brenneis |
| 2011/0297378 A1 | 12/2011 | Reddy et al. |
| 2012/0145393 A1 | 6/2012 | Roddy |
| 2012/0152539 A1 | 6/2012 | Karcher |
| 2012/0227631 A1 | 9/2012 | Roddy |
| 2012/0234541 A1 | 9/2012 | Roddy |
| 2012/0267107 A1 | 10/2012 | Benkley et al. |
| 2012/0285682 A1 | 11/2012 | Santra et al. |
| 2012/0291674 A1 | 11/2012 | Brenneis et al. |
| 2012/0318506 A1 | 12/2012 | Benkley et al. |
| 2012/0325119 A1 | 12/2012 | Brenneis et al. |
| 2012/0325476 A1 | 12/2012 | Brenneis et al. |
| 2012/0325477 A1 | 12/2012 | Brenneis et al. |
| 2012/0328377 A1 | 12/2012 | Brenneis et al. |
| 2013/0008352 A1 | 1/2013 | Roddy et al. |
| 2013/0048286 A1 | 2/2013 | Morgan et al. |
| 2013/0061779 A1 | 3/2013 | Brenneis et al. |
| 2013/0112405 A1 | 5/2013 | Chatterji et al. |
| 2013/0118752 A1 | 5/2013 | Hannegan et al. |
| 2013/0126159 A1 | 5/2013 | Bryan et al. |
| 2013/0153214 A1 | 6/2013 | Roddy et al. |
| 2013/0157903 A1 | 6/2013 | Benkley et al. |
| 2013/0213642 A1 | 8/2013 | Chatterji et al. |
| 2013/0213643 A1 | 8/2013 | Chatterji et al. |
| 2013/0233538 A1 | 9/2013 | Chatterji et al. |
| 2013/0244911 A1 | 9/2013 | Benkley et al. |

FOREIGN PATENT DOCUMENTS

| | | |
|---|---|---|
| CA | 2153372 | 1/2006 |
| CN | 1054620 C | 11/1997 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 4/1983 |
| WO | 93/21122 | 10/1993 |
| WO | 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | 2006/074946 | 7/2006 |
| WO | WO 2007/028952 | 3/2007 |
| WO | 2007/041841 | 4/2007 |
| WO | WO 2007/048999 | 5/2007 |
| WO | WO 2007/128945 | 11/2007 |
| WO | 2009/071962 | 6/2009 |
| WO | WO 2009/138747 | 11/2009 |
| WO | 2012/001343 | 1/2012 |

OTHER PUBLICATIONS

International Search Report and Written Opinion for PCT/US2013/056719 dated Oct. 25, 2013.

International Search Report and Written Opinion for PCT/US2013/048092 dated Nov. 13, 2013.

USPTO Notice of Allowance for U.S. Appl. No. 13/180,238 dated Jan. 22, 2014.

USPTO Notice of Allowance for U.S. Appl. No. 13/851,925 dated Jan. 24, 2014.

USPTO Office Action for U.S. Appl. No. 13/851,475 dated Jan. 24, 2014.

USPTO Office Action for U.S. Appl. No. 13/620,013 dated Jan. 30, 2014.

USPTO Office Action for U.S. Appl. No. 14/079,421 dated Jan. 30, 2014.

(56) References Cited

OTHER PUBLICATIONS

Office Action from U.S. Appl. No. 13/560,406 dated Oct. 17, 2012.
International Search Report for PCT/GB2011/001749 dated Apr. 5, 2012.
International Search Report and Written Opinion for PCT/GB2010/000712 dated Jul. 26, 2010.
Office Action for U.S. Appl. No. 13/620,013 dated Feb. 26, 2013.
U.S. Appl. No. 13/872,063 (Chatterji et al.) filed Apr. 23, 2013.
U.S. Appl. No. 13/889,398 (Benkley et al.) filed May 8, 2013.
U.S. Appl. No. 13/872,063 (Chatterji et al.) filed Apr. 26, 2013.
Notice of Allowance, U.S. Appl. No. 13/669,149 (Brenneis et al.) mailed May 13, 2013.
U.S. Appl. No. 13/767,710 (Benkley et al.) filed Feb. 14, 2013.
U.S. Appl. No. 13/851,391 (Chatterji et al.) filed Mar. 27, 2013.
U.S. Appl. No. 13/851,475 (Chatterji et al.) filed Mar. 27, 2013.
U.S. Appl. No. 13/851,925 (Chatterji et al.) filed Mar. 27, 2013.
U.S. Appl. No. 13/725,833 (Chatterji et al.) filed Dec. 21, 2012.
Office Action for U.S. Appl. No. 13/725,833 (Chatterji et al.) dated Apr. 10, 2013.
U.S. Appl. No. 13/479,476, filed May 24, 2012, Roddy.
U.S. Appl. No. 13/535,145, filed Jun. 27, 2012, Benkley et al.
U.S. Appl. No. 13/560,406, filed Jul. 27, 2012, Brenneis et al.
U.S. Appl. No. 13/595,493, filed Aug. 27, 2012, Benkley.
U.S. Appl. No. 13/606,098, filed Sep. 7, 2012, Brenneis.
U.S. Appl. No. 13/606,120, filed Sep. 7, 2012, Brenneis.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Petroleum Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naigian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art, Petroleum Engineer International", Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.
HES Brochure "Pozmix Cement and Pozmix 140" (undated but admitted as prior art).
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LaFarge brochure "TerraCem™", Aug. 2006.
LaFarge MSDS "Cement Kiln Dust", Mar. 3, 2005.
LaFarge MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-973, 2005.
Answer 13 of 24 Chemical Abstracts on STN "Manufacture of ceramic particles from floatstone and fly ash", CN 1182062 (abstract only) (undated but admitted as prior art).
Answer 3 of 24 Chemical Abstracts on STN "Effect of cement kiln dust substitution on chemical and physical properties and compressive strength of Portland and slag cements", Adb El-aleem et al. (abstract only), 2005.
Expedite Service "A Step-Change Improvement Over Conventional Proppant Flowback Control Systems. Provides Up to Three Times the conductivity of RCP's.", Jun. 2008.
Adaska and Taubert, "Beneficial Uses of Cement Kiln Dust", 2008 IEEE/PCA 50th Cement Industry Technical Conference, Miami, FL, May 19-22, 2008, pp. 1-19, 2008.
Nelson, "Well Cementing", 1990.
"Fly Ash Resource Center-Pozzolan," available at http://www.rmajko.com/pozzolan.htm, Apr. 20, 2009.
HES Brochure "Enhancer 923™ Cement Agent", 2010.
HES Brochure "Enhancer 923™ Agent—Successes from the Field", 2010.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 21, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.

(56) References Cited

OTHER PUBLICATIONS

Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Office Action from U.S. Appl. No. 12/263,800, May 1, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from U.S. Appl. No. 12/609,993, Jul. 26, 2010.
Office Action from U.S. Appl. No. 12/558,097, Sep. 3, 2010.
Office Action from U.S. Appl. No. 12/844,612, Oct. 1, 2010.
Office Action from U.S. Appl. No. 12/544,915, Aug. 1, 2011.
Office Action from U.S. Appl. No. 12/844,612, Sep. 6, 2011.
Office Action from U.S. Appl. No. 12/264,010, Oct. 31, 2011.
Office Action from U.S. Appl. No. 12/844,612, Dec. 23, 2011.
Final Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.
Office Action from U.S. Appl. No. 12/825,004, Jun. 14, 2012.
Notice of Allowance from U.S. Appl. No. 13/447,560, Jun. 21, 2012.
Office action from U.S. Appl. No. 13/479,476, Jul. 2, 2012.
Office action from U.S. Appl. No. 12/975,196, Jul. 3, 2012.
Final Office Action from U.S. Appl. No. 12/844,612, Jul. 30, 2012.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Foreign Search Report from PCT/GB2009/000295, Feb. 3, 2009.
Foreign Search Report from PCT/GB2009/000295, Jul. 30, 2009.
EPO Application No. 06794648.3 Examination Report, Apr. 17, 2009.
EPO Application No. 06779194.7 Examination Report, May 29, 2009.
PCT International Search Report and Written Opinion for International Application No. PCT/GB2009/000295, Jul. 30, 2009.
PCT International Search Report and Written Opinion for International Application No. PCT/GB2009/002598, Feb. 11, 2010.
PCT International Search Report and Written Opinion for International Application No. PCT/GB2009/000295, Aug. 24, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Search Report and Written Opinion for International Application No. PCT/GB2009/002018, Mar. 24, 2011.
PCT International Search Report and Written Opinion for International Application No. PCT/GB2011/000933, Sep. 22, 2011.
PCT International Search Report and Written Opinion for International Application No. PCT/GB2011/001411, Jan. 27, 2012.
English language translation of USSR Patent No. RU 2026959, Jan. 20, 1995.
English language translation of Foreign Office Action for Application No. RU2008113765, Jul. 6, 2009.
English language translation of Chinese Application No. 200680042014.3, Dec. 1, 2010.
Foreign Office Action for Canadian Patent Application No. 2621835, Oct. 2, 2009.
Foreign Office Action for Canadian Patent Application No. 2621832, Oct. 5, 2009.
Foreign Office Action for Canadian Patent Application No. 2650630, Oct. 14, 2010.
Foreign Office Action for Canadian Patent Application No. 2658155, Nov. 16, 2010.
Foreign Office Action for Canadian Patent Application No. 2736148, May 29, 2012.
Foreign Office Action for CN Patent Application No. 200680042004.X, May 12, 2010.
Foreign Office Action for EP Application No. 06 779 199.6, Mar. 1, 2010.
Foreign Office Action for EP Application No. 06 779 191.3, Mar. 31, 2010.
Foreign Office Action for EP Application No. 06 779 194.7, Jul. 2, 2010.
Foreign Office Action for EP Application No. 06 794 646.7, Sep. 24, 2010.
Foreign Office Action for EP Application No. 09 713 469.6, Sep. 28, 2010.
Foreign Office Action for RU Application No. 2008113766, Jul. 14, 2009.
Foreign Office Action for RU Application No. 2008113766, Apr. 8, 2010.
Final Office Action from USPTO for U.S. Appl. No. 13/477,777 dated May 29, 2013.
Office Action from USPTO for U.S. Appl. No. 13/620,013 dated May 28, 2013.
Notice of Allowance from USPTO for U.S. Appl. No. 13/560,406 dated May 29, 2013.
Notice of Allowance from USPTO for U.S. Appl. No. 12/895,436 dated May 28, 2013.
Notice of Allowance from USPTO for U.S. Appl. No. 13/535,145 dated May 24, 2013.
Office Action from USPTO for U.S. Appl. No. 13/851,925 dated Jun. 6, 2013.
Office Action from USPTO for U.S. Appl. No. 13/851,391 dated Jul. 3, 2013.
Office Action from USPTO for U.S. Appl. No. 13/889,398 dated Jun. 20, 2013.
Office Action from USPTO for U.S. Appl. No. 13/872,063 dated Jul. 12, 2013.
Office Action from USPTO for U.S. Appl. No. 13/767,710 dated Jul. 19, 2013.
Notice of Allowance from USPTO for U.S. Appl. No. 13/851,391 dated Jul. 31, 2013.
Notice of Allowance from USPTO for U.S. Appl. No. 13/889,398 dated Aug. 20, 2013.
USPTO Office Action for U.S. Appl. No. 13/431,701 dated Nov. 9, 2012.
USPTO Office Action for U.S. Appl. No. 13/620,163 dated Nov. 9, 2012.
International Search Report and Written Opinion for International Application No. PCT/US2012/046117 dated Oct. 26, 2012.
USPTO Office Action for U.S. Appl. No. 13/669,149 dated Dec. 19, 2012.
USPTO Office Action for U.S. Appl. No. 13/606,098 dated Dec. 13, 2012.
HES Brochure "VersaCem™ Cement" dated Jan. 2007.
Notice of Allowance from U.S. Appl. No. 13/399,913 dated Aug. 23, 2012.
Notice of Allowance from U.S. Appl. No. 13/535,258 dated Sep. 7, 2012.
Notice of Allowance from U.S. Appl. No. 12/825,004 dated Sep. 20, 2012.
Office Action from U.S. Appl. No. 13/477,777 dated Oct. 15, 2012.
Notice of Allowance from U.S. Appl. No. 12/844,612 dated Oct. 18, 2012.
Final Office Action from U.S. Appl. No. 12/975,196 dated Oct. 23, 2012.
Office Action from U.S. Appl. No. 13/555,624 dated Oct. 19, 2012.

(56) References Cited

OTHER PUBLICATIONS

U.S. Appl. No. 13/622,821, filed Sep. 19, 2012.
U.S. Appl. No. 13/620,163, filed Sep. 14, 2012.
U.S. Appl. No. 13/620,013, filed Sep. 14, 2012.
U.S. Appl. No. 13/662,111, filed Oct. 26, 2012.
U.S. Appl. No. 13/669,149, filed Nov. 5, 2012.
Non-Final Official Action for U.S. Appl. No. 13/598,052 dated Nov. 21, 2014.
Communication of the Board of Appeal from European Patent Office for European Application No. 06779194.7 dated May 10, 2016.

* cited by examiner

SEALANT COMPOSITIONS COMPRISING CEMENT KILN DUST AND TIRE-RUBBER PARTICLES AND METHOD OF USE

CROSS-REFERENCE TO RELATED APPLICATIONS

This application is a continuation-in-part of U.S. patent application Ser. No. 12/821,412, entitled "Methods of Plugging and Abandoning a Well Using Compositions Comprising Cement Kiln Dust and Pumicite," filed on Jun. 23, 2010, which is a continuation-in-part of U.S. patent application Ser. No. 12/606,381, entitled "Methods of Cementing Subterranean Formation Formations Using Cement Kiln Dust in Compositions Having Reduced Portland Cement Content," filed on Oct. 27, 2009, issued as U.S. Pat. No. 7,743,828, which is a continuation-in-part of U.S. application Ser. No. 12/420,630, issued as U.S. Pat. No. 7,631,692, entitled "Settable Compositions Comprising a Natural Pozzolan and Associated Methods," filed on Apr. 8, 2009, which is a continuation-in-part of U.S. patent application Ser. No. 12/349,676, issued as. U.S. Pat. No. 7,674,332, entitled "Extended Settable Compositions Comprising Cement Kiln Dust and Associated Methods," filed on Jan. 7, 2009, which is a divisional of U.S. patent application Ser. No. 12/034,886, issued as U.S. Pat. No. 7,478,675, entitled "Extended Settable Compositions Comprising Cement Kiln Dust and Associated Methods, filed on Feb. 21, 2008, which is a continuation-in-part of U.S. patent application Ser. No. 11/223,669, issued as U.S. Pat. No. 7,445,669, entitled "Settable Compositions Comprising Cement Kiln Dust and Additive(s)," filed Sep. 9, 2005, the entire disclosures of which are incorporated herein by reference.

BACKGROUND

The present invention relates to cementing operations and, more particularly, in certain embodiments, to sealant compositions that comprise cement kiln dust ("CKD") and tire-rubber particles and associated methods of use in servicing well bores.

In cementing methods, such as well construction and remedial cementing, sealant compositions are commonly utilized. As used herein, the term "sealant composition" refers to a composition(s) that hydraulically sets or otherwise develops compressive strength suitable for use in subterranean applications. While a hydraulic composition is one type of sealant composition that may be used in cementing methods, other non-hydraulic sealant compositions also may be employed. By way of example, polymeric sealant compositions also may be used.

Sealant compositions may be used in primary-cementing operations whereby pipe strings, such as casing and liners, are cemented in well bores. In performing primary cementing, a sealant composition may be pumped into an annulus between a subterranean formation and the pipe string disposed in the subterranean formation or between a pipe string and a larger conduit in the subterranean formation. The sealant composition should set in the annulus, thereby forming an annular sheath of hardened cement (e.g., a cement sheath) that supports and positions the pipe string in the well bore and bonds the exterior surface of the pipe string to the walls of the well bore.

Sealant compositions also may be used in remedial-cementing operations, such as sealing voids in a pipe string or a cement sheath. As used herein the term "void" refers to any type of space, including fractures, holes, cracks, channels, spaces, and the like. Such voids may include: holes or cracks in the pipe strings; holes, cracks, spaces, or channels in the cement sheath; and very small spaces (commonly referred to as "microannuli") between an interior surface of the cement sheath and the pipe string or between the exterior surface of the cement sheath and the formation or a larger conduit. Sealing such voids may prevent the undesired flow of fluids (e.g., oil, gas, water, etc.) and/or fine solids into, or from, the well bore. The sealing of such voids, whether or not made deliberately, has been attempted by introducing a sealant composition into the void and permitting it to remain therein to seal the void. If the substance does not fit into the void, a bridge, patch, or sheath may be formed over the void to possibly produce a termination of the undesired fluid flow. Hydraulic pressure may be employed to force the sealant composition into the void. Once placed into the void, the sealant composition may be permitted to harden.

Remedial-cementing operations also may be used to seal portions of subterranean formations or portions of gravel packs. The portions of the subterranean formation may include permeable portions of a formation, fractures (natural or otherwise) in the formation, and other portions of the formation that may allow the undesired flow of fluid into, or from, the well bore. The portions of the gravel pack include those portions of the gravel pack, wherein it is desired to prevent the undesired flow of fluids into, or from, the well bore. A "gravel pack" is a term commonly used to refer to a volume of particulate materials (such as sand) placed into a well bore to at least partially reduce the migration of unconsolidated formation particulates into the well bore. While screenless-gravel-packing operations are becoming more common, gravel-packing operations commonly involve placing a gravel-pack screen in the well bore neighboring a desired portion of the subterranean formation and packing the surrounding annulus between the screen and the well bore with particulate materials that are sized to prevent and inhibit the passage of formation solids through the gravel pack with produced fluids. Among other things, this method may allow sealing of the portion of the gravel pack to prevent the undesired flow of fluids without requiring the gravel pack's removal.

Sealant compositions also may be used during the drilling of the well bore in a subterranean formation. For example, in the drilling of a well bore, it may be desirable, in some instances, to change the direction of the well bore. In some instances, sealant compositions may be used to facilitate this change of direction, for example, by drilling a pilot hole in a hardened mass of cement, commonly referred to as a "kickoff plug," placed in the well bore. Certain formations may cause the drill bit to drill in a particular direction. For example, in a vertical well, this may result in an undesirable well bore deviation from vertical. In a directional well (which is drilled at an angle from vertical), after drilling an initial portion of the well bore vertically, the direction induced by the formation may make following the desired path difficult. In those and other instances, special directional drilling tools may be used, such as a whipstock, a bent sub-downhole motorized drill combination, and the like. Generally, the directional drilling tool or tools used may be orientated so that a pilot hole is produced at the desired angle to the previous well bore in a desired direction. When the pilot hole has been drilled for a short distance, the special tool or tools are removed, if required, and drilling along the new path may be resumed. To help ensure that the subsequent drilling follows the pilot hole, it may be necessary to drill the pilot hole in a kickoff plug, placed in the well bore.

In those instances, prior to drilling the pilot hole, a sealant composition may be introduced into the well bore and allowed to set to form a kickoff plug therein. The pilot hole then may be drilled in the kickoff plug, and the high strength of the kickoff plug helps ensure that the subsequent drilling proceeds in the direction of the pilot hole.

Sealant compositions (e.g., hydraulic compositions) used heretofore may comprise Portland cement. Portland cement generally is a major component of the cost for the sealant compositions. To reduce the cost of such sealant compositions, other components may be included in the sealant composition in addition to, or in place of, the Portland cement. Such components may include fly ash, slag cement, shale, metakaolin, zeolite, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a hydraulic composition that, when combined with water, may set to form a hardened mass.

Once set, the hardened settable composition (e.g., the cement sheath) may be subjected to a variety of cyclic, shear, tensile, impact, flexural, and/or compressive stresses that may lead to failure of the cement sheath. Such failure may be the result of fractures, cracks, and/or debonding of the sheath from the pipe string and/or the formation. Undesirably, cement-sheath failure may lead to loss of zonal isolation, resulting, for example, in the undesirable migration of fluids between formation zones. This may lead to undesirable consequences such as lost production, costly remedial operations, environmental pollution, hazardous rig operations resulting from unexpected fluid flow from the formation caused by the loss of zonal isolation, and/or hazardous production operations. Furthermore, failure of the cement sheath also may be caused by forces exerted by shifts in subterranean formations surrounding the well bore, cement erosion, and repeated impacts from the drill bit and the drill pipe. Additives may be included in the settable composition to improve the mechanical properties and thus reduce sheath failure. However, these additives are often expensive and can undesirably increase the cost of the cementing operation.

SUMMARY

An embodiment of the present invention provides a method comprising: providing a sealant composition comprising cement kiln dust, tire-rubber particles, and water; and allowing the sealant composition to set.

Another embodiment of the present invention provides a method comprising: preparing a dry blend comprising cement kiln dust and tire-rubber particles; mixing the dry blend with water to form a sealant composition that is pumpable, wherein the cement kiln dust is present in the sealant composition in an amount of at least about 70% by weight of a total amount of cementitious components present in the sealant composition; introducing the sealant composition into a well-bore annulus; and allowing the sealant composition to set in the well-bore annulus.

Another embodiment of the present invention provides a sealant composition comprising cement kiln dust, tire-rubber particles, and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the present invention disclose sealant compositions comprising CKD, tire-rubber particles, and water. One of the many potential advantages of the methods and compositions of the present invention is that the tire-rubber particles may be used in the CKD-containing sealant compositions to improve the mechanical properties thereof and reduce the risk of cement-sheath failure. In addition, as the tire-rubber particles are processed from rubber tires, a waste material, they may lower the consumption of more expensive components (e.g., rubber materials) that are typically used for mechanical-property improvement in cementing applications.

The sealant compositions may be used in a number of different applications in which the sealant compositions may be introduced into a subterranean formation and allowed to harden, for example. One example is a subterranean application that may include primary-cementing methods in which the sealant composition may be allowed to harden in a well-bore annulus. Another example is a subterranean application that may include remedial-cementing methods in which the sealant composition may be allowed, for example, to harden and seal voids in pipe strings or cement sheaths, to seal highly permeable formation zones or fractures, to place a cement plug, and the like. The sealant compositions may also be used in surface applications, such as construction cementing.

In some embodiments, the sealant compositions may comprise CKD, which is a material generated in the manufacture of cement. CKD, as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The term "CKD" or "cement kiln dust" is used herein to mean cement kiln dust made as described above and equivalent forms of cement kiln dust made in other ways.

The CKD generally may exhibit cementitious properties, in that it may set and harden in the presence of water. In accordance with embodiments of the present invention, the CKD may be used, among other things, to replace higher cost cementitious components, such as Portland cement, resulting in more economical sealing compositions. In addition, substitution of the CKD for the Portland cement should result in a sealant composition with a reduced carbon footprint. In some embodiments, the sealant composition may be Portland-free. For example, a sealant composition may comprise the CKD in an amount of about 100% by weight of a total amount of cementitious components ("bwoc") present in the sealant composition, the sealant composition being free of any additional cementitious components, for example. Cementitious components include those components or combinations of components of the sealing compositions that hydraulically set, or otherwise harden, to develop compressive strength, including, for example, CKD, hydraulic cement (e.g., Portland cement), fly ash, pumicite, slag, shale, and the like. In alternative embodiments, the CKD may be present in a sealant composition in an amount in a range of from about 1% to about 100% bwoc. For example, the CKD may be present in an amount ranging between any of and/or including any of about 1%, about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or about 100%, all concentrations bwoc. One of ordinary skill in the art, with the benefit of this disclosure, will recognize the appropriate amount of CKD to include for a chosen application.

While the preceding description describes CKD, the present invention is broad enough to encompass the use of other partially calcined kiln feeds in the sealant compositions in an amount, for example, in a range of from about 1% to about 100% bwoc. For example, embodiments of the sealant compositions may comprise lime kiln dust, which is a material that is generated during the manufacture of lime. The term "lime kiln dust" typically refers to a partially calcined kiln feed which can be removed from the gas stream and collected, for example, in a dust collector during the manufacture of lime. The chemical analysis of lime kiln dust from various lime manufactures varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

In some embodiments, the sealant compositions may comprise tire-rubber particles, which are rubber particles from processed rubber tires (e.g., car tires, truck tires, etc.). Currently, a problem exists with the accumulation of rubber tires in landfills, dumps, and recycling facilities, due to an inadequate market for their recycled rubber. Some used tires may be incinerated or used for fuel at power plants. In other instances, used tires may be used to produce building materials. However, disposal of used tires remains a problem. In accordance with present embodiments, the used tires may be processed to prepare tire-rubber particles which may then be used in the sealant compositions described herein, for example. Without limitation, processing the used tires may include, for example, mechanically removing metal such as steel surrounding the inner core of the tire and thereafter shredding and grinding into the desired particles size.

The tire-rubber particles may be processed to have a wide variety of shapes and sizes of individual particles suitable for use in accordance with embodiments of the present invention. By way of example, the tire-rubber particles may have a well-defined physical shape as well as an irregular geometry, including the physical shape of platelets, shavings, fibers, flakes, ribbons, rods, strips, spheroids, beads, pellets, tablets, or any other physical shape. The mean particulate sizes of the tire-rubber particles may generally range from about 2 nanometers to about 3,000 microns in diameter; however, in certain circumstances, other mean particle sizes may be desired and will be entirely suitable for practice of the present invention. For example, the swellable particles may have a mean particle size in the range of about 5 microns to about 1,500 microns and, alternative, in the range of about 20 microns to about 500 microns. However, particle sizes outside these defined ranges also may be suitable for particular applications.

Generally, the tire-rubber particles may be included in embodiments of the sealant compositions in an amount sufficient to provide the desired mechanical properties, for example. In some embodiments, the tire-rubber particles may be present in a sealant composition in an amount in a range of from about 0.1% to about 50% bwoc. In particular embodiments, the tire-rubber particles may be present in an amount in a range of from about 1% to about 20% bwoc and, alternatively, in a range of from about 2% to about 15% bwoc.

The water used in embodiments of the sealant compositions of the present invention may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the geopolymer cement composition. In some embodiments, the water may be included in an amount sufficient to form a pumpable slurry. In some embodiments, the water may be included in a sealant composition of the present invention in an amount in a range of from about 40% to about 200% bwoc. In some embodiments, the water may be included in an amount in a range of from about 40% to about 150% bwoc.

In some embodiments, the sealant compositions may further comprise a hardenable resin. For example, the hardenable resin may be intermittently injected into sealant composition as the sealant composition is placed into the subterranean formation. As used herein, the term "resin" refers to any of a number of physically similar polymerized synthetics or chemically modified natural resins including thermoplastic materials and thermosetting materials. The hardenable resin may auto-catalyze or use a hardening agent or other catalyst to facilitate setting of the resin into a hardened mass. Those of ordinary skill in the art will appreciate that the hardenable resin may be used in combination with an optional hardening agent resin composition and optional solvent(s). As used herein, the term "hardening agent" refers to any substance capable of transforming the hardenable resin into a hardened, consolidated mass. Examples of suitable hardenable resins and compositions thereof with hardening agents and solvents are described in more detail in U.S. Pat. No. 7,762,329, the disclosure of which is incorporated herein by reference.

Examples of hardenable resins that may be used in the liquid hardenable resin component include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing. One resin that may be used in particular embodiments of the present invention is the consolidation agent commercially available from Halliburton Energy Services, Inc., of Duncan, Okla., under the trade name "EXPEDITE™."

Generally, the hardenable resin may be included in embodiments of the sealant composition in an amount sufficient to provide the desired flexibility and toughness to the set sealant composition, for example. In some embodiments, the hardenable resin may be present in a sealant composition in an amount in a range of from about 0.1% to about 50% bwoc. In particular embodiments, the hardenable resin may be present in an amount in a range of from about 1% to about 20% bwoc and, alternatively, in a range of from about 2% to about 15% bwoc.

In some embodiments, the sealant compositions may further comprise a latex. For example, the latex may be intermittently injected into sealant composition as the sealant composition is placed into the subterranean formation. As will be understood by those skilled in the art, the latex may comprise any of a variety of rubber materials that are commercially available in latex form. Examples of suitable rubber materials include natural rubber (e.g., cis-1,4-polyisoprene), modified natural rubber, synthetic rubber, and combinations thereof. Synthetic rubber of various types may be utilized, including ethylene-propylene rubbers, styrene-butadiene rubbers, nitrile rubbers, nitrile butadiene rubbers, butyl rubber, neoprene rubber, polybutadiene rubbers, acrylonitrile-styrene-butadiene rubber, polyisoprene rubber, and 2-acrylamido-2-methylpropanesulfonic acid-styrene-butadiene rubber and salts thereof, any combinations thereof. In certain embodiments, the synthetic rubber may comprise 2-acrylamido-2-methylpropanesulfonic acid or salts thereof in an amount ranging from about 7.5% to about 10%, styrene in an amount ranging from about 30% to about 70% and butadiene in an amount ranging from about 30% to about 70%. Examples of suitable 2-acrylamido-2-methylpropanesulfonic acid-styrene-butadiene rubbers are described in more detail in U.S. Pat. Nos. 6,488,764 and 6,184,287, the entire disclosures of which are incorporated herein by reference. Those of ordinary skill in the art will appreciate that other types of synthetic rubbers are also encompassed within the present invention.

In certain embodiments, the latex comprises a water-in-oil emulsion that comprises styrene-butadiene rubber. As will be appreciated, the aqueous phase of the emulsion comprises an aqueous colloidal dispersion of the styrene-butadiene copolymer. Moreover, in addition to the dispersed styrene-butadiene copolymer, the emulsion may comprise water in the range of from about 40% to about 70% by weight of the emulsion and small quantities of an emulsifier, polymerization catalysts, chain-modifying agents, and the like. As will be appreciated, styrene-butadiene latex is often produced as a terpolymer emulsion that may include a third monomer to assist in stabilizing the emulsion. Non-ionic groups which exhibit stearic effects and which contain long ethoxylate or hydrocarbon tails also may be present.

In accordance with embodiments of the present invention, the weight ratio of the styrene to the butadiene in the latex may range from about 10:90 to about 90:10. In some embodiments, the weight ratio of the styrene to the butadiene in the emulsion may range from about 20:80 to about 80:20. An example of a suitable styrene-butadiene latex has a styrene-to-butadiene weight ratio of about 25:75 and comprises water in an amount of about 50% by weight of the emulsion. Such a styrene-butadiene latex is available from Halliburton Energy Services, Duncan, Okla., under the name Latex 2000™ cement additive. Another example of a suitable styrene-butadiene latex has a styrene-to-butadiene weight ratio of about 30:70.

Where present, the latex may generally be provided in sealant compositions of the present invention in an amount sufficient for the desired application. In some embodiments, the latex may be included in a sealant composition in an amount in a range of from about 5% to about 45% bwoc. In particular embodiments, the latex may be included in a sealant composition in an amount in a range of from about 5% to about 20% bwoc. It should be understood that the concentrations of the latex is provided based on the amount of the aqueous latex that may be used.

Embodiments of the sealant cement compositions of the present invention may comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, G, and H cements according to American Petroleum Institute, API Specification for Materials and Testing for Well Cements, API Specification 10, Fifth Ed., Jul. 1, 1990. In addition, in some embodiments, cements suitable for use in the present invention may be classified as ASTM Type I, II, or III.

Where present, the hydraulic cement generally may be included in the sealant compositions in an amount sufficient to provide the desired compressive strength, density, and/or cost. In accordance with embodiments, at least a portion of the hydraulic cement and potentially even all of the hydraulic cement may be replaced with CKD. In an embodiment, at a least a portion of the hydraulic cement is replaced with CKD. In some embodiments, the hydraulic cement may be present in the sealant compositions of the present invention in an amount in the range of 0% to about 99% bwoc. The hydraulic cement may be present, in certain embodiments, in an amount of 0%, about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or about 99%. One of ordinary skill in the art, with the benefit of this disclosure, will recognize the appropriate amount of the hydraulic cement to include for a chosen application.

Optionally, other additional additives may be added to embodiments of the sealant compositions of the present invention as deemed appropriate by one skilled in the art, with the benefit of this disclosure. Examples of such additives include, but are not limited to, strength-retrogression additives (e.g., sand or other sources of silica), set accelerators, weighting agents, lightweight additives, gas-generating additives, mechanical-property-enhancing additives, lost-circulation materials, filtration-control additives, dispersants, fluid-loss-control additives, defoaming agents, foaming agents, oil-swellable particles, water-swellable particles, thixotropic additives, latex stabilizers, suspending aids, and combinations thereof. Specific examples of these, and other, additives include crystalline silica, amorphous silica, fumed silica, salts, fibers, hydratable clays, hematite, microspheres, rice husk ash, elastomers, elastomeric particles, combinations thereof, and the like. A person having ordinary skill in the art, with the benefit of this disclosure, will readily be able to determine the type and amount of additive useful for a particular application and desired result.

Those of ordinary skill in the art will appreciate that embodiments of the sealant compositions generally should have a density suitable for a particular application. By way of example, embodiments of the sealant compositions may have a density of about 12 pounds per gallon ("lb/gal") to about 20 lb/gal. In certain embodiments, the sealant compositions may have a density of about 14 lb/gal to about 17 lb/gal. Embodiments of the sealant compositions may be foamed or unfoamed or may comprise other means to reduce vary their densities, such as a weighting agent, which may be a lightweight or a heavyweight additive. Lightweight additives are generally additives that may be included in a cement composition to reduce its density below about 13 lb/gal, for example, and may include bentonite, gilsonite, expanded perlite, microspheres (e.g., glass spheres), and combinations thereof, among others. Heavyweight additives may be included in the sealant compositions to increase density. Examples of suitable heavyweight additives include, but are not limited to, ilmenite, hematite, barite, manganese tetraoxide, and combinations thereof.

In some embodiments, the sealant compositions may have suitable properties for use in subterranean applications. For example, the sealant compositions may have a thickening time of greater than about 1 hour, alternatively, greater than about 2 hours, alternatively greater than about 5 hours at 3,000 psi and temperatures in a range of from about 50° F. to about 400° F., and alternatively, in a range of from about 80° F. to about 250° F. As used herein, the term "thickening time" refers to the time required for a cement composition to reach 70 Bearden units of Consistency ("Bc") as measured on a high-temperature high-pressure consistometer in accordance with the procedure for determining cement thickening times set forth in API Recommended Practice 10B-2 (July 2005). By way of further example, the sealant compositions may have a 24-hour compressive strength in a range of from about 250 psi to about 20,000 psi and, alternatively, from about 350 psi about 3,000 psi at atmospheric pressure and temperatures in a range of from about 50° F. to about 400° F. and, alternatively, in a range of from about 80° F. to about 250° F. As used herein, the term "compressive strength" refers to the destructive compressive strength measured in accordance with API Recommended Practice 10B-2 (July 2005) by physically testing the strength of the sealant composition after setting by crushing the sample in a compression-testing machine. The compressive strength is measured at a specified time after the composition has been mixed and the composition is maintained under specified temperature and pressure conditions. The compressive strength is calculated from the failure load divided by the cross-sectional area resisting the load and is reported in units of pound-force per square inch ("psi").

The components of the sealant compositions comprising CKD, tire-rubber particles, and water may be combined in any order desired to form a sealant composition that can be placed into a subterranean formation. In addition, the components of the sealant compositions may be combined using any mixing device compatible with the composition, including a bulk mixer, for example. In some embodiments, a dry blend may first be formed by dry blending dry components comprising CKD and tire-rubber particles. As desired, other dry additives may also be included in the dry blend. The dry blend may then be combined with water to form the sealant composition. Liquid additive(s) may be included in the water prior, during, or after combination with the dry blend. Other suitable techniques may be used for preparation of the sealant compositions as will be appreciated by those of ordinary skill in the art in accordance with embodiments of the present invention.

As will be appreciated by those of ordinary skill in the art, embodiments of the sealant compositions of the present invention may be used in a variety of cementing operations, including surface and subterranean operations, such as primary cementing, remedial cementing, plug formation in drilling operations. In some embodiments, a sealant composition comprising CKD, tire-rubber particles, and water may be provided and allowed to set to form a hardened mass. In some embodiments, the sealant composition may be placed into a subterranean formation and allowed to set therein. As used herein, introducing the sealant composition into a subterranean formation includes introduction into any portion of the subterranean formation, including, without limitation, into a well bore drilled into the subterranean formation, into a near well bore region surrounding the well bore, or into both. In some embodiments, the sealant composition may be foamed. As desired by those of ordinary skill in the art, with the benefit of this disclosure, the sealant compositions useful in this invention may comprise any of the above-listed additives, as well as any of a variety of other additives suitable for use in subterranean applications.

Another example of a method of the present invention is a method of cementing a conduit (e.g., pipe string, casing, expandable casing, liners, etc.) disposed in a well bore. An example of such a method may comprise providing a sealant composition of the present invention; introducing the settable composition into a well-bore annulus; and allowing the sealant composition to set in the annulus to form a hardened mass. The well-bore annulus may include, for example, an annular space between a conduit and a wall of a well bore or between the conduit and a larger conduit in the well bore. Generally, in most instances, the hardened mass should fix the conduit in the well bore. In some embodiments, the sealant compositions may be foamed. As desired by those of ordinary skill in the art, with the benefit of this disclosure, the sealant compositions useful in this invention may comprise any of the above-listed additives, as well as any of a variety of other additives suitable for use in subterranean applications.

The conduit may also be cemented into a well-bore annulus by utilizing what is known as a reverse-cementing method. The reverse-cementing method comprises displacing the sealant composition into the annulus between the conduit string and the annulus between an existing string, or an openhole section of the wellbore. As the sealant composition is pumped down the annular space, drilling fluids ahead of the sealant composition are displaced around the lower ends of the conduit and up the inner diameter of the conduit and out at the surface. The fluids ahead of the resin-based sealant may also be displaced upwardly through a work string that has been run into the inner diameter of the conduit and sealed off at its lower end. Because the work string has a smaller inner diameter, fluid velocities in the work string will be higher and will more efficiently transfer the cuttings washed out of the annulus during placement of the resin-based sealant. In an embodiment, a small amount of sealant composition will be pumped into the conduit and the work string. As soon as a desired amount of sealant composition has been pumped into the annulus, the work string may be pulled out of its seal receptacle and excess sealant composition that has entered the work string can be reverse-circulated out the lower end of the work string to the surface.

Another technique for cementing a conduit disposed in a well bore may comprise preparing a dry blend comprising CKD and tire-rubber particles. In some embodiments, the dry blend may be Portland-free and comprise CKD in an amount of about 100% bwoc. The dry blend may then be mixed with water to the desired density and rheological conditions to form a sealant composition that is pumpable. The sealant composition may be placed into a well bore annulus while the sealant composition is still in a "fluid state," such that it continues to transmit hydrostatic pressure. The well-bore annulus may include, for example, an annular space between a conduit and a wall of a well bore or between the conduit and a larger conduit in the well bore. At a predetermined time after being placed, the sealant composition may set to form a hardened mass having desirable mechanical properties, for example, to provide a seal across various subterranean zones.

Another technique for cementing a conduit disposed in a well bore may comprise preparing a dry blend comprising CKD and tire-rubber particles. In some embodiments, the dry blend may be Portland-free and comprise CKD in an amount of about 100% bwoc. The dry blend may then be mixed with water to the desired density and rheological conditions to form a sealant composition that is pumpable. The sealant composition may be placed into a well bore annulus while the sealant composition is still in a "fluid state" such that it continues to transmit hydrostatic pressure. The well-bore annulus may include, for example, an annular space between a conduit and a wall of a well bore or between the conduit and a larger conduit in the well bore. During the placement of the sealant composition into the well-bore annulus, relatively small quantities of a hardenable resin (e.g., from about 2 gallons to about 20 barrels) may be intermittently injected into the sealant composition. At a predetermined time after being placed, the sealant composition may set to form a hardened mass having desirable mechanical properties, for example, to provide a seal across various subterranean zones. From intermittent injection of the hardenable resin, the well-bore annulus should include spaced resin lock rings from setting of the sealant composition with the hardenable resin that are located at predetermined locations in the well-bore annulus.

Another technique for cementing a conduit disposed in a well bore may comprise preparing a dry blend comprising CKD and tire-rubber particles. In some embodiments, the dry blend may be Portland-free and comprise CKD in an amount of about 100% bwoc. The dry blend may then be mixed with water to the desired density and rheological conditions to form a sealant composition that is pumpable. The sealant composition may be placed into a well bore annulus while the sealant composition is still in a "fluid state" such that it continues to transmit hydrostatic pressure. The well-bore annulus may include, for example, an annular space between a conduit and a wall of a well bore or between the conduit and a larger conduit in the well bore. During the placement of the sealant composition into the well-bore annulus, a hardenable resin may be injected into the sealant composition to provide increased ductility to the sealant composition comprising CKD and tire-rubber particles. At a predetermined time after being placed, the sealant composition may set to form a hardened mass having desirable mechanical properties, for example, to provide a seal across various subterranean zones.

Another technique for cementing a conduit disposed in a well bore may comprise preparing a dry blend comprising CKD and tire-rubber particles. In some embodiments, the dry blend may be Portland-free and comprise CKD in an amount of about 100% bwoc. The dry blend may then be mixed with water to the desired density and rheological conditions to form a sealant composition that is pumpable. The sealant composition may be placed into a well bore annulus while the sealant composition is still in a "fluid state," such that it continues to transmit hydrostatic pressure. The well-bore annulus may include, for example, an annular space between a conduit and a wall of a well bore or between the conduit and a larger conduit in the well bore. During the placement of the sealant composition into the well-bore annulus, a latex may be injected into the sealant composition to provide increased ductility to the sealant composition comprising CKD and tire-rubber particles. At a predetermined time after being placed, the sealant composition may set to form a hardened mass having desirable mechanical properties, for example, to provide a seal across various subterranean zones.

Another technique for cementing a conduit disposed in a well bore may comprise preparing a dry blend comprising CKD and tire-rubber particles. In some embodiments, the dry blend may be Portland-free and comprise CKD in an amount of about 100% bwoc. The dry blend may then be mixed with water to the desired density and rheological conditions to form a sealant composition that is pumpable. The sealant composition may be placed into a well bore annulus while the sealant composition is still in a "fluid state" such that it continues to transmit hydrostatic pressure. The well-bore annulus may include, for example, an annular space between a conduit and a wall of a well bore or between the conduit and a larger conduit in the well bore. During the placement of the sealant composition into the well-bore annulus, relatively small quantities of a latex (e.g., from about 2 gallons to about 20 barrels) may be intermittently injected into the sealant composition. At a predetermined time after being placed, the sealant composition may set to form a hardened mass having desirable mechanical properties, for example, to provide a seal across various subterranean zones. From intermittent injection of the latex, the well-bore annulus should include spaced rings of more a more ductile set sealant composition with the latex that are located at predetermined locations in the well-bore annulus.

Another example of a method of the present invention includes a method of sealing a portion of a gravel pack or a portion of a subterranean formation. An example of such a method may comprise placing a sealant composition into the portion of the gravel pack or the portion of the subterranean formation, and allowing the sealant composition to set. The portions of the subterranean formation may include, for example, permeable portions of the formation and fractures (natural or otherwise) in the formation and other portions of the formation that may allow the undesired flow of fluid into, or from, the well bore. The portions of the gravel pack may include, for example, those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. In some embodiments, the sealant compositions of the present invention may be foamed or extended. As desired by one of ordinary skill in the art, with the benefit of this disclosure, the sealant compositions of the present invention useful in this method may comprise any of the above-listed additives, as well any of a variety of other additives suitable for use in subterranean applications.

Another example of a method of the present invention includes a method of sealing voids located in a conduit (e.g., pipe string, casing, expandable casings, liners, etc.) or in a cement sheath. Generally, the conduit will be disposed in a well bore, and the cement sheath may be located in the annulus between the conduit an openhole section of the well bore or between the conduit and a larger conduit. An example of such a method may comprise placing the sealant composition into the void, and allowing the sealant composition to set in the void. In some embodiments, the sealant compositions of the present invention may be foamed or extended. As desired by one of ordinary skill in the art, with the benefit of this disclosure, the sealant compositions of the present invention useful in this method may comprise any of the above-listed additives, as well any of a variety of other additives suitable for use in subterranean applications.

When sealing a void in a conduit, methods of the present invention, in some embodiments, further may comprise locating the void in the conduit, and isolating the void by defining a space within the conduit in communication with the void; wherein the sealant composition may be introduced into the void from the space. The void may be isolated using any suitable technique and/or apparatus, including bridge plugs, packers, and the like. The void in the conduit may be located using any suitable technique. When sealing a void in the cement sheath, the methods of the present invention, in some embodiments, further may comprise locating the void in the cement sheath, producing a perforation in the conduit that intersects the void, and isolating the void by defining a space within the conduit in communication with the void via the perforation, wherein the sealant composition is introduced into the void via the perforation. The void in the cement sheath may be located using any suitable technique. The perforation may be created in the conduit using any suitable technique, for example, perforating guns. The void may be isolated using any suitable technique and/or apparatus, including bridge plugs, packers, and the like.

It should be understood that the compositions and methods are described in term's of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
   providing a sealant composition comprising kiln dust, tire-rubber particles, and water;
   determining locations in a wellbore annulus where a hardenable resin or latex is to be placed to provide increased ductility;
   intermittently injecting about 2 gallons to about 20 barrels of the hardenable resin or latex into the sealant composition while the sealant composition is being introduced into the well-bore annulus such that the hardenable resin or latex is placed in the locations in the wellbore annulus; and
   allowing the sealant composition to set in the well-bore annulus, wherein the set sealant composition forms a hardened mass in the well-bore annulus and the resin or latex forms spaced apart rings within the hardened mass in the locations.

2. The method of claim 1 wherein the kiln dust comprises cement kiln dust.

3. The method of claim 1 wherein the kiln dust comprises lime kiln dust.

4. The method of claim 1 wherein the kiln dust is present in the sealant composition in an amount of at least about 70% by weight of a total amount of cementitious components present in the sealant composition.

5. The method of claim 1 wherein the kiln dust is present in the sealant composition in an amount of at least about 90% by weight of a total amount of cementitious components present in the sealant composition.

6. The method of claim 1 wherein the sealant composition is Portland-free and comprises the kiln dust in an amount of about 100% by weight of a total amount of cementitious components present in the sealant composition.

7. The method of claim 6 wherein the kiln dust comprises cement kiln dust, and wherein the tire-rubber particles are present in the sealant composition in an amount in a range of from about 2% to about 15% by weight of a total amount of cementitious components present in the sealant composition.

8. The method of claim 1 wherein the tire-rubber particles are present in the sealant composition in an amount in a range of from about 0.1% to about 50% by weight of a total amount of cementitious components present in the sealant composition.

9. The method of claim 1 wherein the sealant composition comprises at least one additive selected from the group consisting of a strength-retrogression additive, a set accelerator, a weighting agent, a lightweight additive, a gas-generating additive, a mechanical-property-enhancing additive, a lost-circulation material, a filtration-control additive, a dispersant, a fluid-loss-control additive, a defoaming agent, a foaming agent, an oil-swellable particle, a water-swellable particle, a thixotropic additive, a latex stabilizer, a suspending aid, and any combination thereof.

10. The method of claim 1 wherein the sealant composition comprises at least one additive selected from the group consisting of crystalline silica, amorphous silica, fumed silica, a salt, a fiber, a hydratable clay, hematite, microspheres, rice husk ash, elastomers, an elastomeric particle, and any combination thereof.

11. The method of claim 1 wherein the sealant composition is introduced into a subterranean formation.

12. The method of claim 11 wherein the sealant composition is used in a primary-cementing method.

13. The method of claim 11 wherein the sealant composition is used in a remedial-cementing method.

14. The method of claim 11 wherein the sealant composition is used in a reverse-cementing method.

15. The method of claim 11 wherein the sealant composition is allowed to harden and form a sheath in a well-bore annulus between a conduit in the subterranean formation and a well-bore wall or between the conduit and a larger conduit in the subterranean formation.

16. A method of cementing in a subterranean formation comprising:
    preparing a dry blend comprising cement kiln dust and tire-rubber particles;
    mixing the dry blend with water to form a sealant composition that is pumpable, wherein the cement kiln dust is present in the sealant composition in an amount of at least about 70% by weight of a total amount of cementitious components present in the sealant composition;
    determining locations in a wellbore annulus where a hardenable resin or latex is to be placed to provide increased ductility;
    introducing the sealant composition into a well-bore annulus;
    intermittently injecting about 2 gallons to about 20 barrels of a hardenable resin or latex into the sealant composition while the sealant composition is being introduced into the well-bore annulus such that the hardenable resin or latex is placed in the locations in the wellbore annulus; and
    allowing the sealant composition to set in the well-bore annulus, wherein the set sealant composition forms a hardened mass in the well-bore annulus and the resin or latex forms spaced apart rings within the hardened mass in the locations.

17. The method of claim 16 wherein the cement kiln dust is present in the sealant composition in an amount of at least about 90% by weight of a total amount of cementitious components present in the sealant composition.

18. The method of claim 16 wherein the sealant composition is Portland-free and comprises the cement kiln dust in an amount of about 100% by weight of a total amount of cementitious components present in the sealant composition.

19. The method of claim 18 wherein the tire-rubber particles are present in the sealant composition in an amount in a range of from about 2% to about 15% by weight of a total amount of cementitious components present in the sealant composition.

20. The method of claim 16 wherein the tire-rubber particles are present in the sealant composition in an amount in a range of from about 0.1% to about 50% by weight of a total amount of cementitious components present in the sealant composition.

21. The method of claim 16 wherein the well-bore annulus is between a conduit in the subterranean formation and a well-bore wall or between the conduit and a larger conduit in the subterranean formation.

22. The method of claim 16 wherein the hardenable resin is intermittently injected into the sealant composition.

23. The method of claim 16 wherein the latex is intermittently injected into the sealant composition.

\* \* \* \* \*